United States Patent [19]
Johnson

[11] 4,081,922
[45] Apr. 4, 1978

[54] DOUBLE FISH POLE JIGGER

[76] Inventor: Elias J. Johnson, 503 Stevens St., Green Bay, Wis. 54303

[21] Appl. No.: 735,529

[22] Filed: Oct. 26, 1976

[51] Int. Cl.² ............................................. A01K 97/10
[52] U.S. Cl. .................................................. 43/19.2
[58] Field of Search .............................. 43/19.2, 26.1

[56] References Cited

U.S. PATENT DOCUMENTS

| | | | |
|---|---|---|---|
| 2,758,407 | 8/1956 | Speidell | 43/19.2 |
| 2,992,504 | 7/1961 | Cape | 43/19.2 |

*Primary Examiner*—Russell R. Kinsey
*Assistant Examiner*—Daniel J. Leach
*Attorney, Agent, or Firm*—Gerald P. Welch

[57] ABSTRACT

A rectangular plate base supports three vertical standards. The two outermost standards at the top thereof each support a level rack holding a pair of oppositely disposed fish poles. A third standard is centrally disposed on the base plate and has a number of spaced rectangular apertures adapted to hold a single rectangular peg at chosen heights to modify the angle of a pair of arms when they are moved up and down by an electric motor to cause jig movements of the two fish lines attached thereto.

2 Claims, 1 Drawing Figure

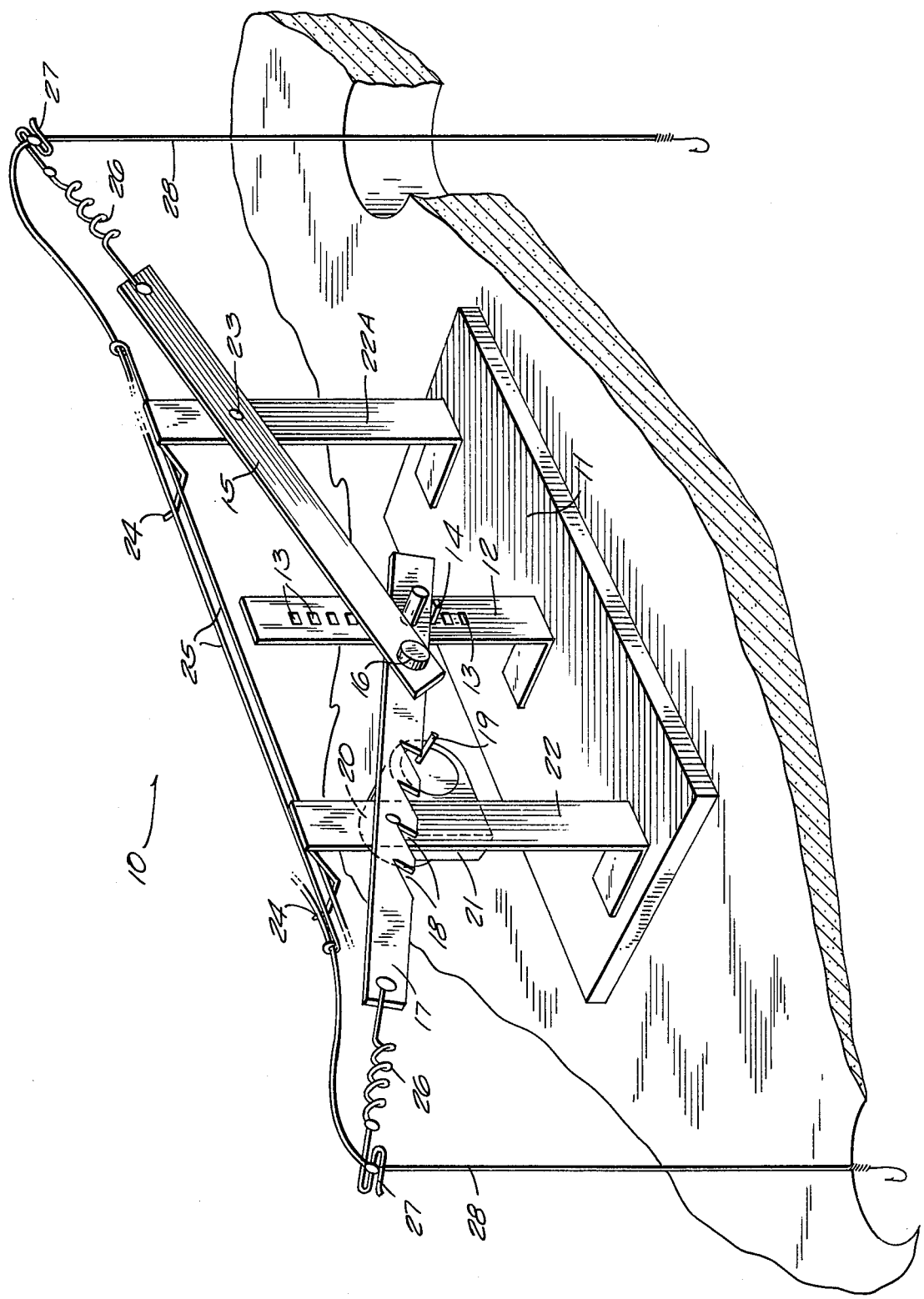

DOUBLE FISH POLE JIGGER

BRIEF SUMMARY OF THE INVENTION

The invention is a device suitable for ice fishing including a pair of fish lines electrically operable to move up and down separately through two separately spaced holes in the ice, known in the trade as alternate jigging movement.

BRIEF DESCRIPTION OF THE DRAWING

A perspective view from above shows a rectangular base supporting three angular standards, the central and shorter vertical portion having a plurality of spaced rectangular apertures adapted to receive a peg in a chosen aperture to change the movement of arms and spring elements clamped to the fish lines and hooks held in the water.

A cam actuated by an electric motor moves the dual arms in their pivot travel.

DETAILED DESCRIPTION

The automatic fish jigger 10 has a rectangular base 11 which is equipped with a central standard 12 having a plurality of rectangular apertures vertically spaced as at 13. A rectangular peg 14 is inserted in one of the openings 13 to vary the jig movement.

The jig arm 15 is pivoted frontally by means of the element 16 to the arm 17, the latter having indentations at 18 to receive and release a cam 19 rotated by an electric motor 20 powered by the battery 21, both fixed on the standard 22. A pivot element 23 holds arm 15 to the standard 22A.

The standards 22 and 22A are both provided at the upper end with a horizontal rack 24 as a rest for the fish poles 25.

The arms 15 and 17 have at each free end a spring element 26 terminating in a spring clamp 27 for securely retaining the fish lines 28.

In use, motor 20 rotates cam 19 which engages an indentation 18 in arm 17 to cause pivotal and jigging movement of arm 17. The inner end of arm 17 rises and falls to the extent permitted by the position of peg 14 in a selected one of the openings 13 in standard 12. Arm 15, being connected to arm 17 at its inner end by pivot element 16, is also caused to jig about its pivot element 23, thus providing for simultaneous jigging of fish lines 28 which are retained in the spring clamps 27 at the outer ends of the respective arms.

Having thus described the invention, what is claimed and desired to be secured by Letters Patent of the United States, is:

1. A dual fish line jigger including a base, a pair of vertical standards each fixed adjacent to an end of said base, an electric motor fixed to one of the standards, an electric battery attached thereto, a rotary cam driven by said motor to cause upward movement of a pair of pivoted arms mutually joined by pivot and peg means.

2. A device according to claim 1, and a central vertical standard on said base having a plurality of vertically spaced rectangular apertures adapted to receive a rectangular plug used to vary the movements of the pivot arms.

* * * * *